United States Patent [19]

Nishikawa

[11] Patent Number: 5,739,854
[45] Date of Patent: Apr. 14, 1998

[54] IMAGE PICKUP APPARATUS

[75] Inventor: Yoshikazu Nishikawa, Yokohama, Japan

[73] Assignee: Canon Kabushiki Kaisha, Tokyo, Japan

[21] Appl. No.: 718,602

[22] Filed: Sep. 24, 1996

Related U.S. Application Data

[63] Continuation of Ser. No. 271,578, Jul. 7, 1994, abandoned, which is a continuation of Ser. No. 870,947, Apr. 20, 1992, abandoned.

[30] Foreign Application Priority Data

Apr. 22, 1991 [JP] Japan ................... 3-090149
Aug. 30, 1991 [JP] Japan ................... 3-220131

[51] Int. Cl.$^6$ ........................ H04N 5/232
[52] U.S. Cl. ........................ 348/335; 348/363
[58] Field of Search ................... 348/362, 363, 348/364, 335; 396/529

[56] References Cited

U.S. PATENT DOCUMENTS

| | | | |
|---|---|---|---|
| 4,037,254 | 7/1977 | Monahan | 358/228 |
| 4,190,864 | 2/1980 | Dischert | 358/228 X |
| 4,959,728 | 9/1990 | Takahashi et al. | 354/455 X |
| 5,168,365 | 12/1992 | Kawahara | 358/228 |
| 5,325,149 | 6/1994 | Kawahara | 348/363 |

*Primary Examiner*—Wendy Garber
*Attorney, Agent, or Firm*—Robin, Blecker, Daley and Driscoll

[57] ABSTRACT

A video camera apparatus to which a lens unit is detachably mounted includes a camera unit having an exposure control circuit for producing an exposure control signal from an image pickup signal and transmitting it to an utilization device, a lens unit used as the utilization device and having an iris control circuit for producing an iris control signal based on the exposure control signal provided by the exposure control circuit and a signal indicative of diaphragm condition of an iris, and a data communication channel for communicating a plurality of signals including the exposure control signal in a given cycle between the camera unit and the lens unit. The iris control circuit is so arranged as to control the iris by use of the iris control signal obtained by dividing the exposure control signal transmitted from the camera unit into a given number of times within a one communication duration.

28 Claims, 4 Drawing Sheets

IMAGE PICKUP APPARATUS

This is a continuation application under 37 CFR 1.62 of prior application Ser. No. 08/271,578, filed Jul. 7, 1994, abandoned, which is a continuation of Ser. No. 07/870,947, filed Apr. 20, 1992, abandoned.

BACKGROUND OF THE INVENTION

1. Field of the Invention

The present invention relates to an image pickup apparatus which is so arranged that various functions on a lens unit side can be controlled by transferring control data from a camera unit to a lens unit.

2. Related Background Art

With the recent development of an image processing apparatus including a video tape recorder (hereinafter referred to as VTR), an interchangeable lens which has been generally used in a conventional silver salt camera has begun to be used even in a camera-integrated VTR and the like. When a plurality of interchangeable lenses are to be used in such VTRs as mentioned above, it is necessary to normalize information signals and transmit the encoded control signals representative of exposure condition to a lens unit, in order to ensure sufficient interchangeability on lens control information. From these points of view, various controls such as automatic diaphragm control in the silver salt camera and a video camera having no interchangeable lens and a similar diaphragm control have been realized by performing communication of control information in a given cycle between the camera unit and the lens unit, based on a predetermined communication format. However, according to such a video camera apparatus as mentioned above, transient operation as an amount of light varies can be defined as repetitive operation represented by: (1) variation in a detection output, (2) outputting of iris drive data, (3) communication, (4) driving of an iris, (5) change in an amount of light, and (6) change in a detection output.

Assuming now that an interchangeable lens is used in such apparatus as specified above, the iris drive data must be transmitted in synchronism with a vertical sync signal. Thus, the iris driving will be appreciably delayed due to the presence of communication.

If a loop gain in an iris automatic control system for automatic exposure control is high, its iris control operation becomes excessive, thus resulting in the poor images being hard to see immediately before having been stabilized. In the worst case, it results in hunting.

SUMMARY OF THE INVENTION

Accordingly, the present invention has been made to overcome the abovementioned drawbacks in the prior art, and one object of which is to provide an electronic image pickup apparatus with an interchangeable lens, in which stable automatic exposure control is made possible even in the case where the lens is replaced.

It is another object of the present invention to provide an image pickup apparatus in which the driving control thereof extending over a plurality of times is made possible by one control information provided once, its control operation being stabilized, and the grade of image being highly elevated.

It is a further object of the present invention to provide an image pickup device in which the driving control thereof is carried out a plurality of times during a given cycle based respectively on the control information transmitted in the given cycle from the camera side to the lens side, and the smooth control operation thereof is thereby achieved.

It is yet another object of the present invention to provide an exposure control apparatus whose smooth and stable exposure control operation can be accomplished by performing actual iris control n times with respect to one exposure control signal.

In order to accomplish such objects as mentioned above, according to one preferred embodiment, there is disclosed a camera system including a camera unit and a lens unit detachably mounted on the camera unit, both units being so arranged that a controlled object on the lens unit side is controlled based on the control information transmitted from the camera unit, to be characterized by further comprising operation means for decoding the control information transmitted from the camera unit and generating drive control information used to drive the controlled object, and control means for driving the controlled object a plurality of times within a given period of time based on the drive control information outputted by the operation means.

According to another preferred embodiment of the present invention, there is disclosed a lens unit detachably mounted on a camera unit comprising arithmetic means for calculating drive information used to drive a controlled object based on the control information transmitted in a given cycle from the camera unit, and control means for controlling the controlled object a plurality of times within the aforesaid cycle based on the drive information outputted by the operation means.

According to yet another preferred embodiment of the present invention, there is disclosed an exposure control apparatus comprising operation means for operating diaphragm control information based on the exposure control information transmitted from a camera unit, and control means for controlling an iris a plurality of times within a given period of time based on diaphragm control information outputted by the arithmetic means.

According to still another preferred embodiment of the present invention, there is also disclosed an image pickup apparatus comprising operation means for dividing, into the predetermined number of blocks, control information used to drive a controlled object on a lens unit side based on the control information transmitted from a camera unit, and control means for controlling the controlled object in a given cycle based on the predetermined number of control information outputted by the operation means.

The foregoing and other objects, features and advantages of the present invention will become more apparent from the following detailed description in conjunction with the drawing.

DETAILED DESCRIPTION OF THE PREFERRED EMBODIMENTS

The present invention will be hereinafter explained in such a form that an image pickup apparatus is practiced in an interchangeable lens type video camera apparatus.

Figure 1:
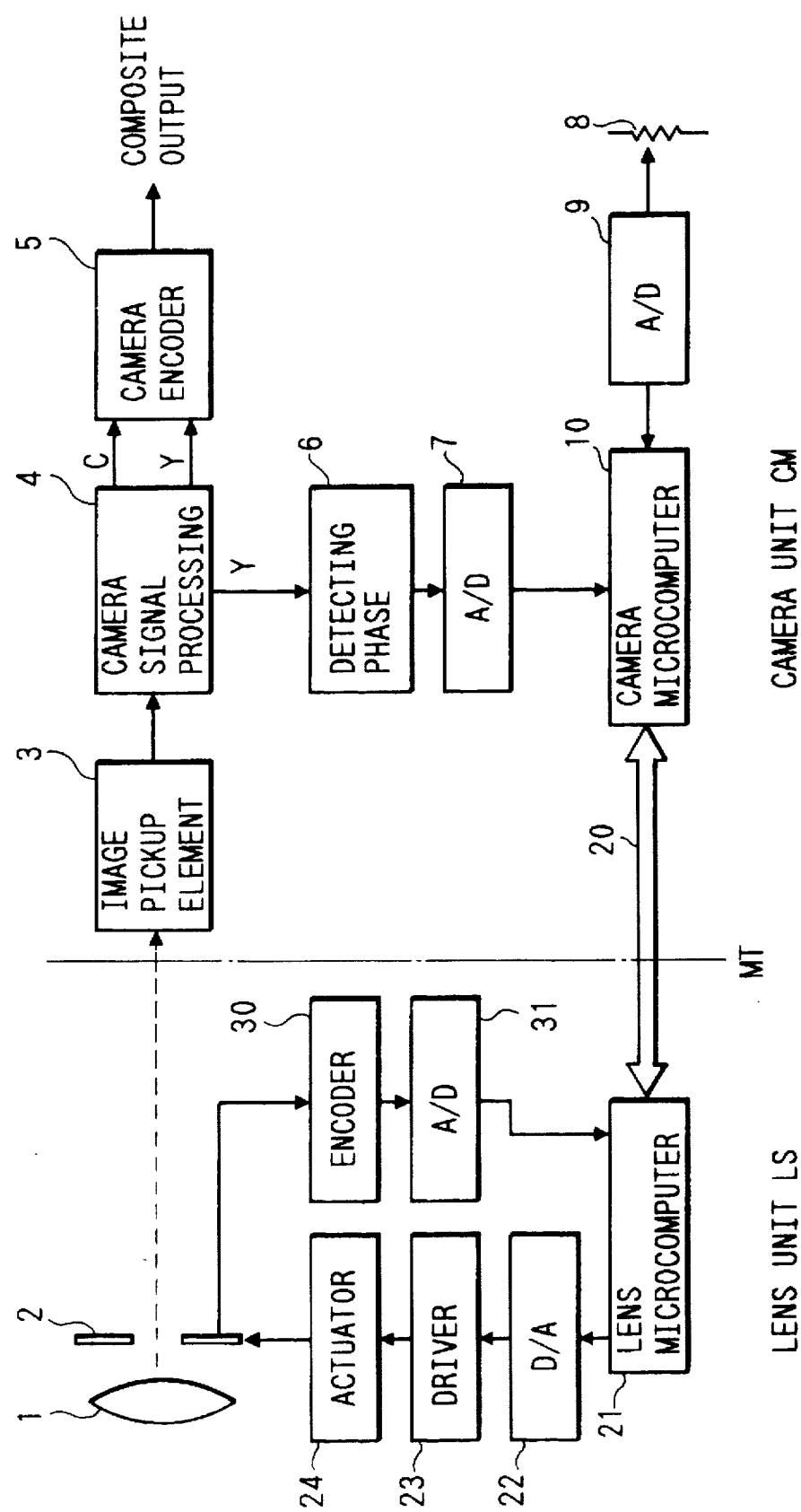
FIG. 1 is a block diagram showing one embodiment of the present invention.

In particular, FIG. 1 is a block diagram showing one embodiment of the interchangeable lens type video camera apparatus to which the present invention is applied.

As clearly seen from FIG. 1, a lens unit LS shown on the left side is so constructed that it can be mounted on a camera unit CM shown on the right side by way of a mount MT represented by a dashed line located in the center of the drawing.

An image of the subject focused on an image picking-up plane of an image pickup element 3 such as CCD and the like through a lens optical system 1 and an iris 2 is photo-electrically converted into an image pickup signal by the image pickup element 3. The image pickup signal is γ(gamma) processed by a camera signal processing circuit 4 to obtain an image signal consisting of chrominance signal C and luminance signal $Y_r$. The image signal is formed into a composite image signal and the like at an encoder 5 of NTSC, for example, and outputted from the camera unit CM.

In addition, the luminance signal Y outputted by the camera signal processing circuit 4 is detected by a detecting phase circuit 6 in order to generate a control signal used for controlling the iris 2 in such a manner that the optimum exposure corresponding to luminance conditions of an image plane can be obtained. The outputs of the detecting phase circuit 6 are converted into digital data by use of an analog-digital converter (hereinafter referred to as AD converter) 7 and provided to a camera micro computer 10. The reference voltage generated at a reference voltage generator 8 is converted into digital data by an AD converter 9, supplied to the camera micro computer 10 and used to normalize the digital data representative of the luminance signal.

Arithmetic processing for normalization at this time will be performed according to the following equation:

$$Di=(Y_c-Y_b)/(Y_r-Y_b)\times 32$$

where,

Di: iris data $Y_c$: AE control signal inputted into the camera micro computer $Y_r$: $Y_c$ level at the time of reference level $Y_b$: $Y_c$ level at the time of light interception of the image pickup element 32: coefficient conveniently selected for an iris control data operation circuit used in the present system.

As the result of the foregoing arithmetic operation, an encoded exposure condition control signal will be obtained.

Next, construction and operation of the lens unit LS will be explained in detail.

The exposure condition control signal inputted into a lens micro computer 21 via a data communication channel 20 is compared with a digital signal obtained through an AD converter 31 which receives the output of an iris encoder 30, in order to calculate iris control data. The iris control data is supplied to an actuator 24 through an AD converter 22 and a driver 23 to drive the iris 2.

On the other hand, the communication of various control information between the camera unit and the lens unit will be performed, in principle, with the timing of image vertical sync signal (V sync) from the camera unit to the lens unit in terms of an ordinally video camera, and various actuators including the iris of the lens unit are thereby controlled.

Figure 2:
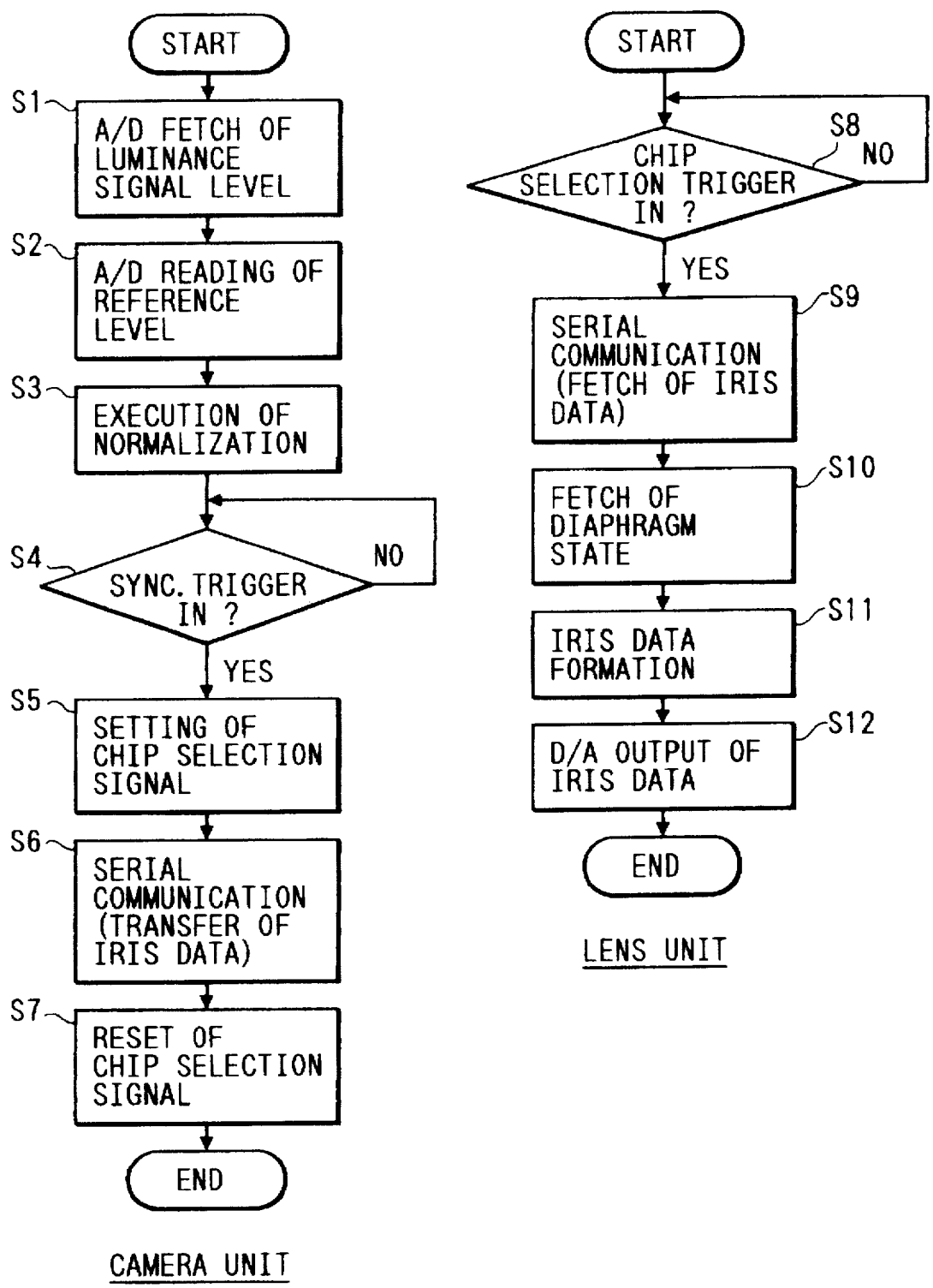
FIG. 2 is a flow chart illustrating fundamental control operation of communication by means of control information used in an interchangeable lens type video camera.

Referring now to FIG. 2, there is shown a flow chart for fundamental sequence of control synchronized with such V sync. First of all, the control operation flow on the camera unit side will be explained.

After starting, the luminance signal level outputted by the detecting phase circuit 6 is fetched in step S1 as data converted into a digital signal at the DC converter 7, and then the reference level of diaphragm control is read out of the AD converter 9 in step 2. The abovementioned normalizing operation is executed in step S3 to produce the exposure condition control signal. In step S4, a decision is made whether or not the V sync corresponding to the specified number is present or the routine waits for the incoming of the specified V sync, and then, the routine will proceed to the next step S5 in synchronism with the reception of that V sync.

In step S5, a chip selection signal is set to cause the lens micro computer on the lens side to be placed under enable condition, and the exposure condition control signal is parallel-serial converted in step S6 according to the communication format between the camera unit and the lens unit, and the transmission from the camera unit CM to the lens unit LS is carried out.

With the transmission completed, the chip selection signal is reset in step S7 to end one transmission. In this way, the lens unit is controlled by fulfilling the control sequence with the timing of V sync.

Next, the operation flow of the lens micro computer 21 will be explained in detail.

When the control operation in the lens unit side is started, a decision is made, in step S8, whether the chip selection signal has been transmitted from the camera unit side, and the routine proceeds to step S9 when the reception of the chip selection signal is ascertained. In step S9, the lens micro computer 21 fetches the exposure condition control signal from the camera unit side by the serial communication performed via the data communication channel 20.

In step S10, the lens micro computer 21 fetches the data detected by the encoder 30 and representing the current diaphragm condition by way of the AD converter 31. The current diaphragm condition is compared with the exposure condition control signal transmitted from the camera unit side to produce iris control data used to actually control the iris, in step S11. In the final step S12, the lens micro computer 21 supplies the iris control data obtained in step S11 to the DA converter 22 and drives the actuator 24 via the driver 23 to control the iris.

Briefly, the fundamental construction of the interchangeable lens type video camera apparatus is accomplished, as described above, in the form that various functions such as iris and others on the lens unit side LS are controlled based on the control data transmitted in a given cycle from the camera unit CM side. As will be understood from the communication of control information between the camera unit and the lens unit as described above, diaphragm control operation similar to the automatic diaphragm control in the silver salt camera can be thereby realized.

According to the abovementioned fundamental construction, there arises no hindrance so far as ordinary photographing is concerned. However, taking the transient operation in the event that an amount of light of field varies into account, it will be specified as repetitive operation of the so called "variation in an amount of light →variation in the detection output →calculation and outputting of the iris drive data →communication toward the lens unit side →iris driving →change in an amount of light (compensation) →change in the detection output".

In the case of the interchangeable lens type video camera apparatus, since the exposure condition control signal, that is, iris drive data is transmitted to the lens unit side in synchronism with V sync, the iris driving will be delayed due to the presence of communication.

Accordingly, if a loop gain in the automatic iris control system for automatic exposure control is high, the iris control operation becomes excessive, thus resulting in the poor image being hard to see immediately before having been stabilized. In the worst case, it results in hunting.

On the other hand, if any provision is made to stabilize AE system, it causes the control operation to retard. As the result, it poses such problems that the required exposure control may not be finished within the lens.

The present invention has been made to eliminate the abovementioned drawbacks and provides an electronic image pickup apparatus for use with an interchangeable lens, in which stable automatic exposure control is made possible even in the case where the lens is interchanged, as will be explained in detail below.

In short, a system of the present invention comprises, in combination a camera unit having exposure control signal forming means for producing exposure condition control signal based on a reference signal and data representative of a luminance signal which has previously been subjected to detection and digital conversion, a lens unit having iris control data forming means for producing iris control data based on the exposure condition control signal and a signal representing the diaphragm conditon of iris, and a data communication channel for transmitting the exposure condition control signal from the camera unit to the lens unit, wherein the lens unit further includes counting means for counting the number of times the iris is controlled, produces iris control data by dividing the exposure condition control signal received from the camera unit into the predetermined number of times within one communication duration, and performs the exposure control by dividing the driving of iris into the predetermined number of times.

More specifically, the exposure control signal forming means produces the exposure condition control signal based on the reference signal and the data indicative of the luminance signal of field obtained after having been photoelectrically converted and subjected to detection and digital conversion, and transmits it to the lens unit by way of the data communication channel. On the other hand, in the lens unit, the iris control data is produced by the iris control data forming means based on the exposure condition control signal and the signal indicative of the diaphragm condition of iris. At this time, the iris control data forming means produces the iris control data by dividing the exposure condition control signal received from the counting means in the camera unit into the predetermined number of times within one communication duration, and performs the repetitive exposure control by dividing the driving of iris into the predetermined number of times.

Consequently, the unstable automatic exposure control that could not have been avoided due to the transmission delay of control signal from the point of time at which the exposure condition control signal is produced by the exposure control signal forming means until the transmission of the exposure condition control signal by the communication means as well as the time lag between the driving of iris and the point of time at which the resultant variation in the luminance signal is inputted into the exposure control signal forming means can be prevented. In other words, stabilized automatic exposure control operation will be achieved even in the case where the lens is interchanged.

Since fundamental circuit configuration for the system mentioned above is the same as that of FIG. 1, the explanation thereof will be made by referring to FIG. 1.

Figure 3:
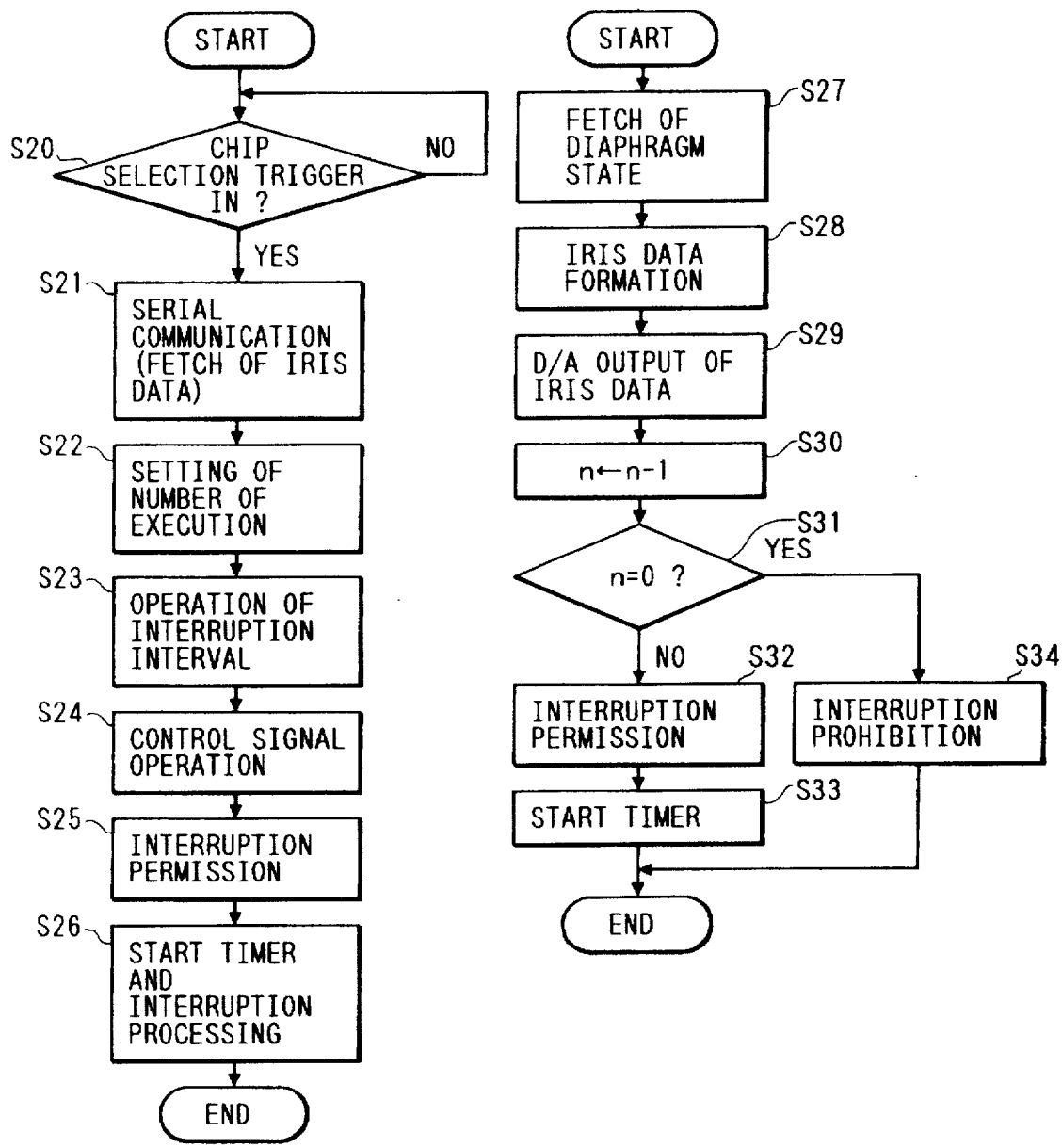
FIG. 3 is a flow chart illustrating the control operation used in the first embodiment of the present invention.

In addition, as construction and operation flow regarding the processing and communication on the camera unit CM side in FIG. 3 is similar to that in FIG. 2, repetitive explanation may be omitted.

As previously described, a lens unit LS shown on the left side is so constructed that it can be mounted on a camera unit CM shown on the right side by way of a mount MT represented by a dashed line positioned in the center of the drawing.

Exposure condition control signal produced on the camera unit side is transmitted to the lens unit LS. As a data communication channel 20 is connected to a lens micro computer 21, the communication of all the control information between the camera unit and the lens unit is performed through a camera micro computer 10 and the lens micro computer 21. Accordingly, all communication data are once or temporarily received by the lens micro computer 21.

The exposure condition control signal received at the lens micro computer 21 is converted therein into iris control data value selected by the value of the exposure condition control signal and the value that corresponds to the output value from a current diaphragm encoder 30 and is converted into a digital form at an AD converter 31. The output of the lens micro computer 21 is converted into an analog value by an AD converter 22 to drive an iris 2 by way of a driver 23 and an actuator 24.

At this juncture, the lens micro computer 21 divides the exposure condition control signal into the predetermined number of times, and carries out iris drive control the predetermined number of times in a constant interval by use of counting means disposed inside the lens micro computer 21.

In the next paragraph, a sequence of operation for the lens micro computer 21 will be explained by referring to the flow chart shown in FIG. 3.

In step S20, it is checked whether or not the chip selection signal is transmitted from the camera unit CM side, or the lens micro computer 21 waits for the incoming of the chip selection signal from the camera unit CM side. If it is ascertained that the chip selection signal is received, the routine will proceed to the step S21 wherein the exposure condition control signal transmitted from the camera side via the data communication channel 20 will be received and fetched.

In step S22, an initial value (n) is set in the number-of-execution measuring counter which sets the number of times the exposure control is carried out apart, and the interval of execution for the exposure control is calculated in step S22 based on the communication cycle (1V) between the camera unit and the lens unit. In step S24, an amount of iris driving expressed by the exposure condition control signal transmitted from the camera side is divided into n times in correspondence with the initial value n set in step S22, thereby permitting one exposure control output data or one controlled variable of iris to be calculated.

The computer 21 permits interruption in step S25, and then the routine proceeds to step S26 wherein the timer for measuring the interval of interruption set in step S23 is started, thereby allowing the processing for interruption to be executed, as will be described later. In this case, the processing for interruption will be commenced when it reaches the predetermined counting value after starting of the timer.

Described just above is a processing routine executed based on one exposure condition control signal provided from the camera unit side. It should be noted that the flow chart in the drawing is shown so as to end when the decision at step S29 is "NO" in order to make one processing more definite, but in reality, it returns to step S20 and waits for the incoming of the next chip selection signal as well as control information from the camera unit side. The processing of interruption will be explained in the next paragraph by referring to the flow chart shown on the right side in FIG. 3.

In step S27, the lens micro computer 21 fetches the signal representative of the current diaphragm condition via the encoder 30 and the AD converter 31 and produces iris control data from the divided exposure condition control signal and the signal indicative of the current diaphragm condition. More concretely, the actual iris control data is produced based on one exposure control signal which is obtained by dividing the exposure condition control signal sent from the camera unit side (step S24) into n times and the signal indicative of the current diaphragm condition.

The iris control data is converted into an analog signal by the D/A converter 22 in step S29, and used to drive the actuator 24 via the driver 23 and finally control the iris.

Continuously, the value n representing the number of times the interruption or the exposure control is carried out is decremented by −1 in step S30, and a decision is made, in step S31, whether n=0 or all the iris control divided into n times are completed. If n=0, it means that the iris control extending over n times is finished, so that the routine proceeds to step S34 to prohibit the interruption process, and returns to the main routine.

Reverting to step S31, if n≠0, it means that the iris control of n times is not yet finished, so that the routine proceeds to step S32 to permit the interruption procedure, and then to step S33 to reset the interruption interval setting timer and restart it, and finally returns to the main routine. As the result, the subsequent processing of interruption will be restarted at the point of time that the predetermined period of time set on the timer has elapsed, even after it has returned to the main routine.

As clearly described above, the intermittent iris control extending over n times with respect to the exposure condition control signal transmitted from the camera unit side can be accomplished by employing such interruption process as shown in the flow chart. Consequently, as compared with the system in which the iris control is carried out at a breath each time the exposure condition control signal is received from the camera unit side, in the system according to the present invention, sudden iris displacement can be prevented, and gradual and smooth iris control not including overshoot of the iris and hunting or the like could be made possible.

While there has been disclosed the system which involves dividing the iris control based on the exposure condition control signal provided from the camera unit side into n times, the amount of driving of the iris may be equally divided into n times or may be non-linearly controlled by changing it each time.

In other words, sudden and unnatural variation of image may be prevented by setting an amount of driving at the starting portion and the ending portion of the iris movement to small, and at the intermediate portion thereof to large, or by adaptively changing its driving speed and an amount of driving at the starting portion and the end portion of movement in correspondence with the current diaphragm value, taking the characteristics of the iris itself into account.

In the abovementioned configuration, the camera micro computer 10 is formed as exposure control signal forming means which produces the exposure condition control signal and transmits it to the lens unit, and the lens micro computer 21 comprises iris control data forming means for forming iris control data and counting means for calculating the number of times the iris is controlled.

As explained above, according to the camera unit of the present invention, the exposure condition control signal is produced based on the reference signal and the signal representative of the luminance of field and obtained after having been photoelectrically converted, detected and converted into digital form, and transmitted to the lens unit via the data communication channel. In the lens unit, the iris control data is formed from the received exposure condition control signal and the signal indicative of the diaphragm condition of iris. At this juncture, the iris control data forming means produces the iris control data obtained by dividing the exposure condition control signal into the predetermined number of times within one communication duration by use of the counting means and performs the repetitive exposure control operation wherein the driving of iris is divided into the predetermined number of times.

As the result of the control operation mentioned above, the unstable automatic exposure control due to the transmission delay of control signal from the point of time at which the exposure condition control signal is produced by the exposure control signal forming means until the transmission of the exposure condition control signal by the communication means as well as due to the time lag between the driving of iris and a point of time at which the resultant variation in the luminance signal is inputted into the exposure control signal forming means can be prevented. Besides, stable automatic exposure control can always be achieved regardless of its photographing condition as well as a kind of a lens unit replaced, since there exists no such phenomenon that it takes a long time until the exposure becomes stabilized, or it causes hunting.

In the next paragraph, there is described another embodiment of the present invention.

As compared with the abovementioned embodiment which was explained as the system controlled by the exposure condition control signal that was supplied from the camera unit side and divided into n blocks, the second embodiment to be disclosed herein will be explained as the system wherein the exposure condition control signal from the camera unit side is used as it is, but the iris control is so configured that it is controlled n times, but not only once.

Since the circuit construction of the second embodiment is just similar to that of the first embodiment shown in FIG. 1, the explanation thereof will be omitted. Different from the first embodiment is only its operation, and the flow chart thereof is illustrated in FIG. 4.

Figure 4:
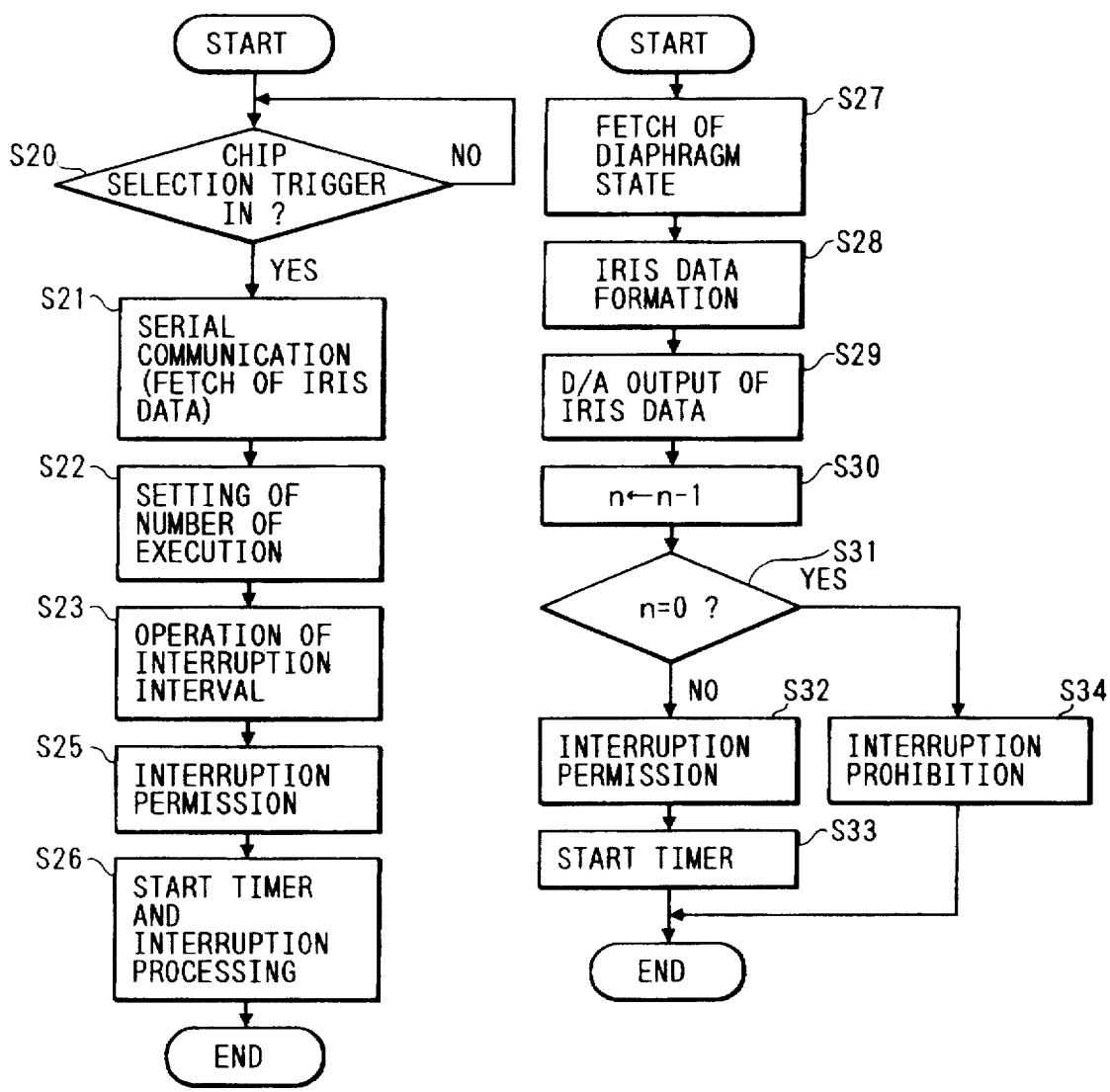
FIG. 4 is a flow chart illustrating the control operation used in the second embodiment of the present invention.

In FIG. 4, all the steps that are substantially the same as the steps in FIG. 3 are demonstrated by the same reference numerals. Main content different from the processings in the flow chart shown in FIG. 3 lies is that, after the number of times the interruption is carried out as well as its interval are set in steps S22 and S23, the exposure condition control signal provided from the camera unit side is not divided into n times, but the permission to interruption is provided in step S25.

Thus, according to this control algorithm, in its interruption process, actual iris drive data is formed based on the current iris condition and the content of exposure condition control signal itself provided from the camera unit side through the processing of step S21 in the main routine, and the iris is thereby controlled.

As clearly understood from the foregoing, this embodiment is so configured that the exposure condition control signal initially provided from the camera unit side is used as it is for respective interruption processings of n times, but the iris is intermittently controlled n times.

Accordingly, natural and smooth iris control operation having no sudden change can be accomplished as the iris control that has been ordinarily done only during the communication cycle with the camera unit can be performed n times during one communication cycle despite the fact that, unlike the first embodiment, the control signal from the camera unit is not divided into n iris control signals.

As explained above, according to the construction of the present invention, so far as the exposure control for this kind of an interchangeable lens system is concerned, the diaphragm control for an iris can be smoothly done in much the same manner as in the case where no communication is present, by repeating the exposure control operation the predetermined number of times within one communication duration in the lens system itself, even in the event that the exposure condition control signal is provided by the camera 10 system via a communication channel.

What is claimed is:

1. A camera system having a camera unit and a lens unit detachably mounted on said camera unit, both said units being so arranged that a controlled object on the lens unit side is controlled by said camera unit by transmissions to said lens unit, said system comprising:
    A) control information generating means in said camera unit for generating control information for said controlled object and outputting said control information at a predetermined interval;
    B) transmitting means for transmitting said outputted control information to said lens unit at said predetermined interval;
    C) operation means in said lens unit for decoding the control information transmitted from said camera unit and converting each of the control information into a plurality of driving values for driving said controlled object by dividing an amount of driving for said controlled object corresponding to said control information into said plurality of driving values;
    D) setting means for setting a dividing number of said amount of driving; and
    E) control means for driving said controlled object a plurality of times corresponding to said dividing number within the predetermined interval based on the plurality of driving values output by said operation means.

2. A camera system according to claim 1, wherein said control information are transmitted in a predetermined communication period from said camera unit to said lens unit, and said given interval corresponds to the duration of said communication period.

3. A camera system according to claim 2, wherein said operation means compares the control information by comparing the control information transmitted from said camera unit with the driving condition of said controlled object, and said control means drives said controlled object by performing interruption processing said plurality of times based on said driving values.

4. A camera system according to claim 2, wherein said communication period corresponds to a vertical sync signal.

5. A camera system according to claim 1, wherein said controlled object is an iris.

6. A camera system according to claim 1, wherein said dividing number set by said setting means is changeable.

7. A lens unit detachably mounted on a camera unit, comprising:
    A) operation means for receiving and decoding control information transmitted from said camera unit at a predetermined interval and for converting the decoded control information into a plurality of driving values for driving a controlled object by dividing an amount of driving for said controlled object corresponding to each of the control information into said plurality of driving values;
    B) setting means for setting a dividing number of said amount of driving; and
    C) control means for driving said controlled object a plurality of times corresponding to said dividing within the predetermined interval based on the plurality of driving values output by said operation means.

8. A lens unit according to claim 7, wherein said control information is transmitted in a given communication period from said camera unit to said lens unit, and said predetermined interval corresponds to the duration of said communication period.

9. A lens unit according to claim 7, wherein said operation means compares the control information transmitted from said camera unit with the driving condition of said controlled object, and said control means drives said controlled object by performing interruption processing said plurality of times based on said driving values.

10. A lens unit according to claim 7, wherein said controlled object is an iris.

11. A lens unit according to claim 7, wherein:
    the number of said plurality of driving values is equal to or greater than 2.

12. A lens unit according to claim 11, wherein said operation means operates said plurality of driving values by comparing the control information transmitted from said camera unit with the driving condition of said controlled object, and said control means drives said controlled object by performing interruption processing n times based on said plurality of driving values.

13. A lens unit according to claim 11, wherein said controlled object is an iris.

14. A lens unit according to claim 7, wherein said dividing number set by said setting means is changeable.

15. An image pickup apparatus comprising:
    A) master-side control means for detecting an operation state of an image picking-up system to generate control information and outputting said control information at a predetermined interval;
    B) operation changing means for changing the operation state of said image picking-up system;
    C) slave-side control means for controlling the operation state of said image picking-up system by the control information output by said master-side control means so as to drive said operation changing means n times within the predetermined interval to attain the change of the operation state of said image picking-up system by dividing an amount of driving for said image picking-up corresponding to said control information into n driving values for changing the operation state, wherein n is an integer equal to or greater than 2; and
    D) setting means for setting a dividing number of said amount of driving.

16. An image pickup apparatus according to claim 15, wherein said slave-side control means includes operation means for obtaining said driving values by comparing the control information output by said master-side control means with a condition of said operation changing means.

17. An image pickup apparatus according to claim 15, wherein said master-side control means is a video camera, and said predetermined interval corresponds to a vertical sync signal.

18. An image pickup apparatus according to claim 17, wherein said operation changing means is iris driving means.

19. An image pickup apparatus according to claim 15, wherein said dividing number set by said setting means is changeable.

20. An image pickup apparatus comprising:
A) exposure changing means for varying exposure;
B) operation means for operating and outputting control information of said exposure changing means in a predetermined interval;
C) control means for controlling said exposure changing means by the control information output by said operation means so as to drive said exposure changing means n times within said predetermined interval by dividing an amount of driving for said exposure changing means corresponding to said control information into n driving values, wherein n is an integer equal to or greater than 2; and
D) setting means for setting a dividing number of said amount of driving.

21. An image pickup apparatus according to claim 20, wherein said control means performs said controls extending over n times by utilization of interruption processing.

22. An image pickup apparatus according to claim 20, wherein said dividing number set by said setting means is changeable.

23. A camera comprising:
A) control information generating means for generating control information for a controlled object and outputting said control information and a predetermined interval;
B) transmitting means for transmitting said outputting control information to a lens unit detachably mounted on said camera at said predetermined interval;
wherein said lens unit comprising:
operation means for said lens unit for decoding the control information transmitted from said camera and converting each of the control information into a plurality of driving values for driving said controlled object to dividing values;
setting means for setting a dividing number of said amount of driving; and
control means for driving said controlled object a plurality of times corresponding to said dividing number within the predetermined interval based on the plurality of driving values output by said operation means.

24. A camera according to claim 23, wherein said dividing number set by said setting means is changeable.

25. A camera system comprising:
A) a master-side microcomputer for detecting an image pickup operation state to generate control information and outputting said control information at a predetermined interval;
B) operation changing means for changing said image pickup operation state;
C) a slave side microcomputer for controlling said image pickup operation state by the control information output by said master-side microcomputer so as to drive said operation changing means a plurality of times within the predetermined interval to attain the change of said image pickup operation state by dividing an amount of driving of said operation changing means corresponding to said control information into a plurality of driving values for changing said image pickup operation state; and
D) setting means for setting a dividing number of said amount of driving.

26. A camera system according to claim 25, wherein said control information are transmitted in a given communication period from said master side microcomputer to said slave-side microcomputer, and said predetermined interval corresponds to the duration of said communication period.

27. A camera system according to claim 26, wherein said slave-side microcomputer includes operation means for obtaining said driving values by comparing the control values output by said master-side microcomputer with a condition of said operation changing means.

28. A camera system according to claim 27, wherein said operation changing means is iris driving means.

* * * * *

UNITED STATES PATENT AND TRADEMARK OFFICE
CERTIFICATE OF CORRECTION

PATENT NO. : 5,739,854
DATED : April 14, 1998
INVENTOR(S) : Yoshikazu Nishikawa

It is certified that error appears in the above-identified patent and that said Letters Patent is hereby corrected as shown below:

Col. 9, line 15, delete "10".

Signed and Sealed this

First Day of December, 1998

*Attest:*

BRUCE LEHMAN

*Attesting Officer*     *Commissioner of Patents and Trademarks*